United States Patent [19]

Berkenblit et al.

[11] 3,961,114

[45] June 1, 1976

[54] GLASS COMPOSITION

[75] Inventors: Melvin Berkenblit, Yorktown Heights; Robert O. Lussow, Hopewell Junction; Arnold Reisman, Yorktown Heights, all of N.Y.

[73] Assignee: International Business Machines Corporation, Armonk, N.Y.

[22] Filed: Aug. 7, 1974

[21] Appl. No.: 495,352

Related U.S. Application Data

[62] Division of Ser. No. 353,026, April 20, 1973.

[52] U.S. Cl. ..................................... 428/38; 65/43; 428/34; 428/428; 428/432
[51] Int. Cl.² ..................... B32B 9/00; B44C 5/08; B06B 3/24
[58] Field of Search ........... 65/43; 106/53; 161/193, 161/196; 428/38, 34, 428, 432

[56] References Cited
UNITED STATES PATENTS

| | | | |
|---|---|---|---|
| 2,248,644 | 7/1941 | Reger et al. | 65/43 |
| 2,749,668 | 6/1956 | Chaffotte | 65/58 X |
| 2,931,142 | 4/1960 | Veries | 161/193 X |
| 2,936,923 | 5/1960 | Veries | 65/43 X |
| 3,002,645 | 10/1961 | Kegg | 65/43 X |
| 3,010,835 | 11/1961 | Charles et al. | 106/40 R |
| 3,011,673 | 12/1961 | Van Zee | 65/43 X |
| 3,075,860 | 1/1963 | Veries | 161/193 X |
| 3,291,586 | 12/1966 | Chapman et al. | 65/43 X |
| 3,391,055 | 7/1968 | Veries | 161/193 |
| 3,734,702 | 5/1973 | Veries | 65/43 |

*Primary Examiner*—Lorraine T. Kendell
*Attorney, Agent, or Firm*—John A. Jordan

[57] ABSTRACT

A glass composition comprises a low glass transition temperature glass and a higher glass transition temperature glass, which glasses are uniquely capable of forming together a continuous vitreous phase over their entire compositional range. During thermal cycling, the low glass transition temperature glass flows out and solubilizes the higher glass transition temperature glass to thereby synthesize in situ a new glass. The low glass transition temperature glass is composed of 14.1% $SiO_2$, 72.8% $PbO$, 12.5% $B_2O_3$, 0.2% $Al_2O_3$, 0.1% $CaO$, 0.2% $Na_2O$, and 0.1% $MgO$, and the higher glass transition temperature glass is composed of 71.11% $SiO_2$, 2.38% $Al_2O_3$, 7.13% $CaO$, 14.45% $Na_2O$, 3.76% $MgO$, 0.30% of $K_2O$, 0.13% $B_2O_3$, and 0.74% $PbO$.

1 Claim, 4 Drawing Figures

FIG. 2

GLASS COMPOSITION

This is a division of application Ser. No. 353,026 filed Apr. 20, 1973.

CROSS-REFERENCE TO RELATED APPLICATIONS

U.S. application Ser. No. 176,625, "Dielectric Insulator for Gaseous Discharge Device" by P. H. Haberland et al., filed Aug. 31, 1971 and now abandoned.

U.S. application Ser. No. 176,626, "Improved Dielectric Insulator for Gaseous Discharge Device" by P. H. Haberland and J. J. Hall, filed Aug. 31, 1971 and now abandoned.

U.S. application Ser. No. 886,100, "Improved Method and Apparatus for a Gas Display Panel" by Tony N. Criscimagna et al., filed Dec. 15, 1969 and now U.S. Pat. No. 3,666,981.

BACKGROUND OF THE INVENTION

1. Field of the Invention

The present invention relates to fabrication processes involving glass and the like and, more particularly, to fabrication processes involving multiple-layered materials systems, such as glass systems used in the fabrication of electronic apparatus, as, for example, gas panel display devices and the like.

2. Description of the Prior Art

One of the difficulties encountered in fabrication processes requiring the assembly of glass parts resides in the fact that the temperature needed to carry out one step of the fabrication process may be detrimental to previously assembled parts. For example, the temperature required for a fusing or welding step may be such as to cause the softening and deformation of previously fabricated and assembled glass parts. Typically, such a problem might be encountered in the manufacture of glass articles.

Exemplary of the above problems are those involved in the manufacture of glass articles, such as cathode ray tubes, wherein it may be necessary as one of the final steps to seal the tube by fusing the glass faceplate to the glass body of the tube. In such a sealing process, the temperature required to fuse the glass faceplate to the body of the tube may be such as to cause damage to prefabricated parts within the glass tube.

One obvious approach employed heretofore to solve the particular problem of damage caused by the relatively high temperatures involved in fusing and sealing glass articles, is to endeavor to find low-melting sealants. Such an approach is employed, for example, by J. Francel et al in U.S. Pat. No. 3,127,278, entitled, "Low-Melting Glass Sealant and Article Made Therefrom." Typical of other low-melting glass for use as a frit (a powder), soldering material, sealant, and the like, are those described by K. Ikeda et al. in U.S. Pat. No. 3,420,683 and 3,425,817. Likewise, F. Veres describes, in U.S. Pat. No. 3,645,839, a low temperature glass sealant containing aluminum titanate. However, as will be explained more fully hereinafter, the low-melting sealant approach is not always successful, where sealing temperature creates the problem.

It should be noted in this regard, that the problem of damage to glass parts due to relatively high temperatures is not necessarily limited to sealing operations required in glass tubes and the like, but may be prevalent fabrication any of a variety of fbrication operations involving glass systems. For example, it is evident that glasses employed for encapsulation must, in general, be relatively low-melting glasses, for otherwise damages to previously formed parts might occur during their flow out operation. Likewise, when one glass layer is deposited upon another, the temperature required for flowing out the former on the latter must be, in general, below the deformation or reflow temperature of the latter, where deformation or reflow must be considered in the context of a time-temperature dependent phenomenon.

It should be understood here that in the fabrication of devices involving glass systems, that a certain amount of softening or reflow in previously formed glass parts therein undergoing some form of temperature processing does not necessarily pose a problem. The degree of softening or reflow which is tolerable in a particular glass part undergoing some form of temperature processing depends upon the nature and function of the part, and how such softening or reflow affects other parts associated therewith. For purposes of description, "reflow" as used herein is intended to mean any "softening", reflow, "excessive reflow", "melting", etc., that is undesirable or intolerable by way of being deleterious to device integrity such as to affect device operation, performance, reliability, life, etc. Typically, reflow that causes even minimal deformation or distortion of previously formed glass parts is, in a great number of present day applications, intolerable, particularly as pertains to applications involving electronics. It should be noted that glasses typically will reflow and deform at any temperature above the glass transition temperature. In this regard, it should also be noted that reflow in glass may occur at any temperature during which the time-temperature cycle involved provides sufficient heat to cause a discernably deleterious change in the glass part being processed.

In fabricating electronic apparatus having composite structures of glass layers, or glass, metal and crystalline layers, for example, it is clear that it is necessary, in general, that the hierarchy of successive different layers achieve sufficiently low viscosities so as to enable flow out to take place at succeedingly lower temperatures, such that as the fabrication steps progress, lower and lower temperatures are required therefor. In particular, as each successive layer of the composite structure is fabricated, it must soften and flow out at a lower temperature than that of any of the previously applied layers. The necessity of this declining flow out temperature hierarchy most often limits design choice. Also limiting design choice is the fact that the magnitude of the coefficient of thermal expansion of each of the successive layers must be compatibly close. However, it is obvious that the above conditions must generally prevail in order to maintain practical structural integrity.

The problem of damage to prefabricated glass parts due to the heat required to carry out fabrication of composite structures is compounded by the fact that design considerations may, at times, require the use of a glass in such structures that deforms at temperatures at or below the temperatures required for subsequent steps in the process. Typically, such subsequent processing steps may involve a sealing operation. As previously mentioned, although various efforts have been made to obtain relatively low temperature sealants, where an unusually low temperature glass is necessary at some point in the fabrication of particular apparatus, it may not be possible to obtain a sealant exhibiting a sufficiently low sealing temperature such that deformation or reflow of the low temperature glass is avoided.

Likewise, design considerations may at times require a structure to be made having a considerable number of layers of glass. Since each successively fabricated layer of glass must normally be produced at a temperature lower than the deformation or reflow temperatures of the glasses employed in fabricating the underlying glass layers thereof, it is clear that a final sealing step, for example, may be required by the glass hierarchy to be made at a temperature lower than the sealing temperature of available sealants.

Accordingly, it is clear that the application temperature of available low-temperature sealants may at times not be sufficiently low so as to be compatible with the rest of the structure involved with the sealing operation. For example, one approach to the fabrication of a.c. gas panel display devices requires that a dielectric glass with a relatively low flow out temperature be fabricated in layer form upon both plates of a pair of conventional relatively low softening point glass plates, having an array of conductors deposited thereon. Typically, commercially available plate glass from LOF (Libby-Owens-Ford) or ASG (American Saint Gobain) are employed for the substrate plate. Thereafter, a thin layer of metal oxide, such as MgO, is deposited upon the glass dielectric layer. As one of the final steps in the fabrication process, the pair of glass plates are sealed together to form a gas tight chamber. However, difficulty has been encountered during the sealing process. Available low-melting glass sealants require a temperature which is, by comparison, high enough to cause some reflow of the previously flowed on glass dielectric layer. The reflow of the glass dielectric layer causes crazing of the overlying thin layer of metal oxide, (such as MgO) and in addition reacts with it. This crazing is intolerable for device performance.

Not only does the device performance require that the above mentioned crazing be avoided but, in addition, to retain structural integrity it is required that, in accordance with practical design constraints, the coefficient of thermal expansion of the various parts of the glass system involved therein vary only slightly from one part to another. However, to devise a glass system wherein the coefficients of thermal expansion of the various parts are compatible with one another and, yet, wherein each successive fabrication step is performed at a temperature sufficiently low so as to not reflow or deform previously formed parts, is quite difficult with the normally available selection of materials.

In regard to the latter, one would normally generally expect in fabricating glass systems, that mixtures of glasses from the normally available selection of materials, in the range of compositions tried, typically would show crystalline or non-crystalline phase separation. In addition, in such mixtures it is to be expected that the properties of the resulting glass are unpredictable. Accordingly, in addition to showing discontinuities at phase boundaries, it can be expected that relatively large and unpredictable variations in the coefficients of thermal expansion and viscosity may exist.

Thus, whether the fabrication problems confronted in glass systems are incident to the fabrication of a.c. gas panel display devices, or any of the variety of electronic apparatus and the like which use glass systems, the problems, to a large degree, are the same.

SUMMARY OF THE INVENTION

In accordance with the principles of the present invention, a fabrication process is provided for overcoming the deleterious effects of the relatively high heat that may be required at some step in the process of fabricating glass systems, such as used in gas panel display devices, and the like.

The present invention achieves this end by providing an in situ method of synthesizing a third glass from two constituent glasses, admixed, for example, and then applied to glass substrate plate. The third glass is formed in situ at a flow-out temperature less than the flow out temperature required where the glass is first synthesized non-in situ and then flowed out on the substrate plate. The glass transition temperature of the in situ formed new glass will be intermediate between the glass transition temperatures of the two constituent glasses and be determined by the relative proportions of the constituent glasses used to form the admixture. The relative proportion of the two glasses is chosen to produce a new glass whose glass transition temperature is high enough to prevent reflow in subsequent processing steps.

More particularly, in accordance with the present invention, an admixed frit, for example, of a high glass transition temperature glass and low glass transition temperature glass is applied to a glass substrate plate. After applying the frit to the substrate plate, the frit is heated somewhat beyond the glass transition temperature of the high glass transition temperature glass but below the deformation temperature of the substrate, whereby the low glass transition temperature glass is made to readily flow out and solubilize, i.e. dissolve the high glass transistion temperature glass therein. This flow out and solubilization is effectively achieved at a temperature significantly below the deformation temperature of the substrate.

It should be understood that whenever the term "transition temperature" is used herein, it is intended to mean glass transition temperature. In this regard, it should be noted that the glass transition temperature provides a more precise and meaningful glass characteristic by which the process of the present invention may be described, as opposed to glass characteristics such as softening temperature, annealing temperature, strain temperature, and the like, which may vary somewhat in accordance with the particular time-temperature cycle employed.

Accordingly, where it is required in the fabrication of a glass system to subject previously formed parts to a temperature in excess of that which would cause a previously applied part to reflow, and where a glass which would not thereby reflow could not have been employed to form said previously applied part because the temperatures required to fabricate same would have caused excessive reflow and attendant distortion in other previously formed parts, the reflow temperature of the most previously applied part can be increased without deforming the other previously formed parts by synthesizing in situ a new glass. The new glass is synthesized in situ by applying two compatible glasses to the substrate therefor, the first with a low glass transition temperature and the second with a higher glass transition temperature. Following the in situ solubilization of the second glass by the first glass, the resultant in situ formed glass exhibits a glass transition temperature intermediate to the two and is itself not subject to further reflow during subsequent fabrication steps.

Thus, where in the fabrication of glass systems design considerations demand that intermediate glass parts be fabricated from a glass which exhibits reflow due to the temperature cycling necessitated at some subsequent processing step, the reflow temperature of these intermediate glass parts may be raised during their fabrication by the in situ combining and flowing out therewith of another glass, in accordance with the principles of the present invention. In accordance with the present invention, a system of intermediate glass parts may be fabricated at flow out temperatures compatible with the temperature constraints imposed by the initially fabricated substrate parts therefor, with the reflow temperature of the intermediate parts being sufficiently raised to selected and predetermined levels in accordance with the selected proportions of the combined glasses, so as to thereby avoid softening and reflow during said subsequent processing step.

By the process of the present invention, a new glass is synthesized in situ at a flow out temperature which is lower than would have been required had the glass been synthesized first and then flowed out as a preequilibrated frit, the synthesized glass being one which exhibits a sufficiently high reflow temperature such that subsequent processing steps do not cause its reflow. Thus, a glass layer, for example, may be formed in situ upon a substrate at a flow out temperature which will not soften and deform the substrate, but which glass layer of its constituents had heretofor been formed upon the substrate in preequilibrated form, the flow out temperature required therefor would have caused said substrate to soften and deform.

It is, therefore, an object of the present invention to provide an improved process for fabricating glass parts.

It is, therefore, a further object of the present invention to provide an in situ process for raising the softening or reflow point of a glass layer by synthesizing a new glass in situ which glass could not itself be flowed out as a starting glass frit at the uppermost temperature permitted to maintain the structural integrity of previously fabricated parts.

It is a further object of the present invention to provide a method of obviating the problem of damage to previously formed glass parts caused by the subsequent processing temperatures required in the fabrication of glass systems.

It is yet another object of the present invention to provide a process for fabricating glass parts at a flow out temperature less than the flow out temperature required had a glass of the same composition, and therefore softening or reflow characteristics, first been synthesized and then flowed out as a preequilibrated frit to thereby form said parts.

It is yet still another object of the present invention to provide a process for fabricating a glass part in a glass system at a flow out temperature such as to not cause softening or reflow in previously fabricated glass parts in said system, and yet such as to form a glass part exhibiting the softening or reflow characteristics of a part which, if otherwise were fabricated, would have caused softening and reflow in said previously fabricated glass parts.

It is yet a further object of the present invention to provide a process for fabricating a composite structure of glass layers, whereby the composition of the glass of each of the successive layers thereof is synthesized in situ at near the same or successively lower temperatures and at temperatures less than those required heretofor to form glass layers of like composition.

It is still a further object of the present invention to provide an in situ process for fabricating composite structures of glass layers whereby successively formed layers may be fabricated by dissolving in situ respective smaller amounts of a higher glass transition temperature glass in a low glass transition temperature glass such that the successively formed layers exhibit respectively decreasing reflow temperatures, with coefficients of thermal expansion which vary minimally from one layer to another.

It is yet still a further object of the present invention to provide a method of synthesizing in situ glasses of predetermined glass transition temperature beginning with two glasses having encompassing high and low glass transition temperatures, said two glasses being used to form the parts of a composite structure of glass parts by physically combining selected proportions thereof for in situ flow out, with said two glasses being taken from a glass compositional system which exhibits monotonically varying glass transition temperatures and a constancy in the coefficients of thermal expansion as a function of composition, without there being present any significant phase separation over the entire compositional range of practical usage.

It is another object of the present invention to provide an in situ method of fabricating a glass part at a temperature below that which would have been required using a preequilibrated glass of the same composition, said method involving in situ elevation of the glass transition temperature of one glass of an admixture by causing it to solubilize a second glass of the admixture during the flow out process employed to form said glass part.

It is yet still another object of the present invention to provide a process for raising the glass transition and reflow temperatures of a low glass transition temperature dielectric glass used in the fabrication of electronic apparatus such as gas panel display devices, and the like, via solubilizing in situ a higher glass transition temperature glass in the low glass transition temperature glass during flow out of the latter such as to thereby form a new glass compatible with previously and subsequently formed parts.

It is still another object of the present invention to provide a method of overcoming the problems caused by damage due to temperature in sealing glass envelopes, tubes and the like.

The foregoing and other objects, features and advantages of the invention will be apparent from the following more particular description of preferred embodiments of the invention, as described in conjunction with the accompanying drawings.

DETAILED DESCRIPTION OF THE DRAWINGS

Although the process of the present invention may be practiced in the fabrication and the like of any of a variety of apparatus, the detailed description of the process will be made with reference to fabrication of an a.c. gas panel display device. The problems encountered in the manufacture of this display device are particularly exemplary of the types of problems which the process, in accordance with the present invention, may solve.

Figure 1:
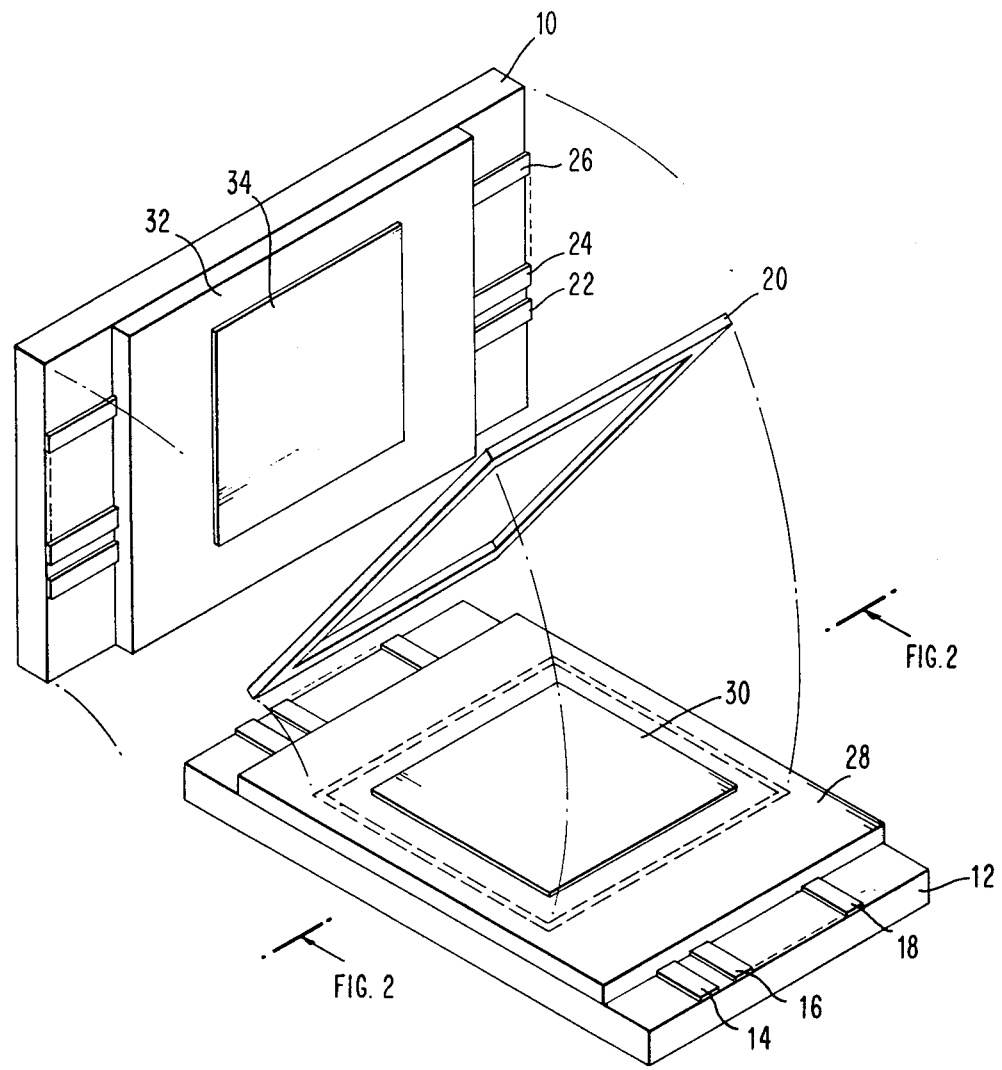
FIG. 1 shows an exploded perspective view of a typical gas discharge panel display arrangement, exemplary of apparatus upon which the process of the present invention may be practiced.
Figure 2:
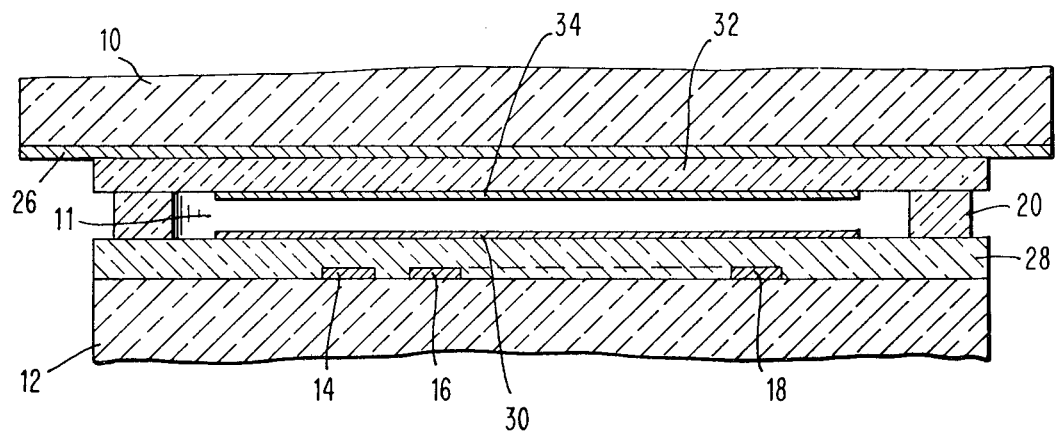
FIG. 2 shows a cross-sectional view of the gas panel of FIG. 1 taken along line 2—2 therein.

With particular reference to FIG. 1, there is shown an exploded perspective view of a relatively simplified arrangement of an a.c. gas panel display device. The perspective and cross-sectional views of the gas panel display device shown in FIGS. 1 and 2 are given for purposes of aiding in both the description of a particular problem encountered in the manufacture thereof and the manner by which the process of the present invention is employed to solve that problem, and are not necessarily given to provide a detailed embodiment or any representations, in regard to a particular display device. In this regard, it should be noted that the structure shown in FIGS. 1 and 2 is not to scale, and that for ease of description the dimensions of certain members thereof have been enlarged.

With reference to FIG. 1, typically in the manufacture of gas panel display devices, at one stage of assembly a pair of glass plates 10 and 12 are required to be soldered or welded together, in fixed spaced-apart relationship, by a continuous glass bead weld, shown illustratively at 20. The welded glass bead must, it is evident, provide a good hermetic seal for the cavity or gas space 11 formed between the pair of plates as shown in FIG. 2. After the sealed cavity is formed, it is evacuated in any of a variety of ways, one of which has been described in more detail in copending application Ser. No. 311,022, entitled "Gas Discharge Panel Structure," filed Nov. 30, 1972 by A. Reisman, issued Jan. 28, 1975 as U.S. Pat. No. 3,862,831, and assigned to the assignee of the present invention.

Prior to welding plates 10 and 12 together, each plate is provided with, on its inner surface, an array of generally parallel conductors, such that when the plates are welded together one array will be generally orthogonal to the other. On plate 12 in FIGS. 1 and 2, these conductors are referenced by 14, 16, and 18. As shown by the dashed line between the conductors 16 and 18, any suitable number of conductors may be deposited thereon, consistent with practical design considerations. In this regard, it is clear that the number of lines employed in each of the arrays will be determined by the number of addressable glow discharge sites or cells desired to be made available in the x-y matrix arrangement thereof.

Likewise, plate 10, as shown in FIGS. 1 and 2, is normally arranged to carry on its inner surface, an array of conductors referenced by 22, 24, and 26, which conductors are arranged to be generally orthogonal to the conductors on the upper surface of plate 12. As in the case with the conductors on plate 12, any suitable number of conductors may be deposited upon plate 10, consistent with practical design considerations. It should be noted that glass plates 10 and 12 may comprise any of a variety of glass compositions.

Typically, plates 10 and 12 may comprise conventional sodalime glass, in plate form. For example, commercially available ASG or LOF plate glass may be employed for plates 10 and 12.

In regard to metal conductors 14–18 and 22–26, any of a variety of metals or alloys may be employed therefor. For example, copper coated both top and bottom with chromium may provide a satisfactory metallization arrangement to be used for these conductors. Although the width and thickness dimensions of the conductors are not critical, conductors from 1 to 3 microns thick have been found to be satisfactory. Likewise, any of a variety of conventional processes may be employed to fabricate the conductor arrays, such as photoetching, vacuum deposition, stencil screening, etc.

For a somewhat more detailed description of gas panel conductor arrays and the dielectrics used to cover same, reference is made to the above referenced copending application, Ser. No. 311,022.

It should be noted with regard to FIGS. 1 and 2 that plates 10 and 12 have each been shown extending longitudinally in the direction of the conductor lines thereon, beyond the edges of its opposite plate. It is to be understood that such a representation is provided more for purposes of convenience in describing the arrays of conductors, than our depicting an actual configuration.

In the normal process of fabricating the display device shown in FIG. 2, prior to the sealing or welding step, a glass dielectric layer is flowed out over the array of conductors on each of glass plates 10 and 12. Thus, as shown in FIG. 1, dielectric layer 28 is initially flowed out to cover the operative surface area of conductors 14-18 and plate 12. Likewise, dielectric layer 32 is initially flowed out to cover the operative surface area of conductors 22–26 and plate 10. Dielectric layers 28 and 32 may typically be, for example, 1 mil thick. Where the substrate glass plates 10 and 12 comprise conventional, relatively soft plate glass, dielectric glass layers 28 and 32 may comprise a high lead type glass, such as a lead-borosilicate glass.

To achieve effective gas panel operation, dielectric layers 28 and 32 are each covered with a thin refractory overcoat layer of, for example, a metal oxide having a high ion induced secondary electron emission coefficient, so as to thereby permit lower operating voltages. Typical of such dielectric overcoat arrangements is that described in the above referenced copending application Ser. No. 311,022. However, in the preferred arrangement, metal oxide overcoat layers 30 and 34 in FIGS. 1 and 2 comprise a thin layer of MgO, since this material has been found to be particularly suitable for such purpose. Typically, MgO layers 30 and 34 may be around 2000 Angstroms thick.

After the array of conductors on each of plates 10 and 12 has been covered with a layer of dielectric and the latter covered with a layer of MgO, for example, the plates are then arranged to be sealed together by welding glass bead 20 so that the spacing between the MgO layers 30 and 34, i.e. cell walls, is typically between 4 and 6 mils.

As shown in FIG. 2, this spacing is not to scale, as are not the other dimensions shown therein. In regard to the sealing step, any of a variety of low temperature sealants may be employed for this purpose. However, the sealant selected must obviously be capable of providing both a strong and permanent hermetic seal, and a mechanically rugged weld between the glass plates.

As can be seen, the seal is made directly between dielectric layers 28 and 32. After the sealed cavity housing the arrays of conductors has been evacuated, as aforesaid, it is baked to remove contaminants and filled with any of the variety of ionizable gases capable of supporting glow discharge. For example, a mixture of neon and 0.10% of argon may be inserted, after evacuation, to an operating pressure of 300 to 550 tor.

Although the operation of a.c. gas panel display devices is well known to those skilled in the art, and is not a part of the present invention, it should be mentioned, in brief, that in the normal mode of operation, x-select and y-select drive circuit means are coupled respectively to the arrays of conductors carried on plates 10 and 12. Thus, the conductors 22–26 on plate 10 may be coupled to an x-select circuit arrangement and the conductors 14–18 on plate 12 may be coupled to a y-select circuit arrangement. Voltages are applied to the x and y lines such that the sum of the two voltages is insufficient to cause a spontaneous discharge to occur in the gas. However, the sum of the two voltages is of such value that when an additional voltage pulse is applied, the sum of the original x and y voltages (known as a sustain voltage) plus the additional voltage (known as a write voltage) is sufficient, even after the removal of the additional write voltage, to cause the discharge to be sustained merely by the continued application of the lower half-select voltages. The minimum voltages that must be applied to the x and y lines which will enable a discharge to be sustained after the application and removal of a write voltage is termed a minimum sustain voltage. The maximum voltages that may be impressed upon the x and y lines such that upon the application of an erase voltage of opposite polarity will result in the extinguishing of a discharge is termed the maximum sustain voltage. In operation, the sum of the voltages impressed upon the x and y electrodes lies between the minimum and maximum sustain voltages.

The Process

Although the process in accordance with the principles of the present invention may find application in a wide variety of fabrication processes involving glass systems, it should be understood that it is particularly suitable for use in fabricating gas panel display devices. Thus, in the fabrication of the gas panel display device shown in FIGS. 1 and 2, as in the fabrication of any of a variety of glass structures, the required sealing operation, as employed in sealing together plates 10 and 12, for example, necessitates the use of a temperature which is sufficiently high to cause damage to the prefabricated parts therein. One of the particular difficulties encountered in fabricating the gas panel display device shown in FIG. 2 resides in the fact that, prior to the present invention, during the process of effectively sealing together plates 10 and 12 via glass bead 20, the temperature required to form the bead was such as to exceed the glass transition temperature of dielectric layers 28 and 32, thereby causing same to soften or reflow. Exceeding the glass transistion temperature of dielectric layers 28 and 32 causes uneven stresses to be applied to the metal oxide of layers 30 and 34, such as MgO, thereby causing the latter to craze, and the like. Moreover, with the dielectric layers 28 and 32 undergoing some reflow, the respective MgO material supported thereby may react with and be incorporated into the dielectric material of these layers. The latter will cause the formation of an intervening layer whose stress characteristics may cause further crazing.

The above described crazing and reaction of the MgO causes a variety of difficulties in display device operation and performance. For example, where the dielectric material reacts with and is incorporated into the MgO, different secondary electron emission characteristics are obtained therefrom than where only MgO is present, i.e. where no reaction occurs. Likewise, the presence of cracks in either one of the MgO layers may perturb the secondary electron emission characteristics of the device. For example, where cracks in either one of the MgO layers exist, the secondary electron emission of the exposed material in the cracks will be different than that of the MgO, thereby causing different gas discharge behavior in such regions. In addition, the regions of the dielectric layers exposed by cracks may become sputtered, with the sputtered material overcoating the MgO, thereby causing general degradation of panel electrical behavior.

The required glass hierarchy for the display device, as shown in FIG. 2, necessitates that the reflow temperature of plate glass substrates 10 and 12, (which causes deformation and the like of these plates) be greater than the temperature required to fabricate dielectric layers 28 and 32. In addition, the glass transition (and therefore reflow) temperature of dielectric layers 28 and 32 must be greater than the temperature required to form welded glass bead 20. However, available sealants for effectively welding plate glass require a temperature in excess of the glass transition temperature of known dielectric glasses compatible with soda lime-based plate glasses. With pyrex-type plate glasses there exist very few known sealants and the problem is even more severe. Dielectric glasses compatible with plate glass substrates 10 and 12 are those glasses which exhibit a coefficient of thermal expansion sufficiently close to that of the plate glass so that no deleterious separation, warping and the like occurs between the dielectric glass layer and the plate glass substrates, with variations in temperature. For this same reason, glass bead 20 must exhibit a coefficient of thermal expansion close to that of the plate glass substrates 10 and 12. In this regard it should be noted that since the spacing between the panel plates must normally be controlled to tenths of a thousandth of an inch and the panels themselves are normally only several thousandths of an inch apart, then it is apparent why distortion of the substrates must be kept vanishingly small during processing. Thus, it can be seen that stringent constraints are imposed upon the fabrication processes involved in the manufacture of the display device shown in FIG. 2. These constraints are typical of those encountered in the fabrication of glass articles.

It is clear that the difficulty with the constraints imposed by the particular glass system shown in FIG. 2 resides in the fact that effective low temperature sealants cannot be readily found to seal at a temperature sufficiently low so as to avoid exceeding the glass transition temperature of glass dielectric layers 28 and 32. On the other hand, the glass transition temperature of dielectric glasses compatible with plate glass substrates 10 and 12 are not sufficiently high so as to be unaffected by the temperatures required for flowing out available sealants.

In accordance with the principles of the present invention, an in situ synthesis and flow out process for effectively forming glass parts is provided, whereby the temperatures required during subsequent processing steps do not cause damage to the formed parts. With respect to the particular article shown in FIG. 2, an in situ synthesis and flow out process is employed for forming dielectric layers 28 and 32 of high enough glass transition temperature such that the thermal cycle used in the subsequent sealing step, required to weld plate glass substrates 10 and 12 together, does not act to adversely soften and reflow these dielectric layers, where these dielectric layers could not otherwise be directly applied in a normal processing procedure.

According to the present invention, the softening or reflow point of a relatively low glass transition temperature glass, used to fabricate intermediate glass parts, is raised during flow out via the incorporation therewith of selected proportions of a higher glass transition temperature glass and the in situ dissolution of the higher glass transition temperature glass into the low glass transition temperature glass. In the preferred mode, the low and higher glass transition temperature glasses are mixed in frit form to make an admixture thereof which is applied to a substrate, for example, by spraying. For ease of application, the mixed frit may be hosted in a suitable vehicle which may or may not include a binder. After applying a layer of frit to the desired substrate, such as substrates 10 and 12, the frit is heated to a temperature sufficient to cause flow out of the low glass transition temperature glass and dissolution therein of the higher glass transition temperature glass whereby glass parts, such as dielectric glass layers 28 and 32, are thereby formed. It should be understood that the temperature required to flow out the low glass transition temperature glass and form the resultant glass layers 28 and 32, is significantly below the deformation point of substrates 10 and 12, and also significantly below the flow out temperature of a preequilibrated glass of the same final composition as layers 28 and 32 formed thereby.

The flow out temperature required by the process of the present invention to reduce the viscosity of the low glass transition temperature glass to a point sufficient to cause reasonable flow out and solubilization of the higher glass transition temperature glass, in general, is slightly in excess of the glass transition temperature of the higher glass transition temperature glass, but below the deformation temperature of the plate glass substrate therefor. In this regard, it should be emphasized that this flow out temperature is, likewise, significantly below the flow out temperature required for a glass of the same composition which is synthesized first and then flowed out as a preequilibrated frit. At the flow out temperature in question, the frit of the lower transition temperature glass will achieve a sufficiently low viscosity, whereby the low glass transition temperature glass will readily flow out and immediately begin to solubilize the frit of the higher glass transition temperature glass. It can be seen, then, that since the higher glass transition temperature glass is not melted, but rather is dissolved in the melt of the low transition temperature glass, the temperature required to flow out the glass layer is less than the temperature required to flow out a preequilibrated glass of like resultant composition. In this regard, the glass layer formed by the process of the present invention exhibits a glass transition temperature lying between the low glass transition temperature glass and the higher glass transition temperature glass, in accordance with the relative proportions of each employed in the admixture.

Although in the preferred mode, the low and higher glass transition temperature glasses are physically combined in situ by first forming an admixture of the frits of these glasses and then applying the admixture to the substrate, it is clear that other modes may be employed for physically combining the glasses in situ. For example, thin alternate layers of each glass could be sprayed, one on the other, starting for example with the low glass transition temperature glass. Alternatively, the alternate layers could be applied such that the low glass transition temperature glass is sprayed on, with the interleaving higher glass transition temperature glass layers being applied in solid sheet form. Likewise, each alternate thin layer of low and higher glass transistion temperature glass could be applied as a thin solid sheet so as to form a solid laminate-like structure. In each of these arrangements, it is clear that thermal processing is employed, as previously mentioned, such as to dissolve the higher glass transition temperature glass into the low glass transition temperature glass. It can be seen that as the alternate layers become thinner and thinner, this mode of physically combining the glasses in situ comes closer to the admixture mode.

It is clear that frits of each glass may be applied by any of a variety of techniques. Where spraying, for example, is employed, a slurry of the frit of each glass may be applied from individual spray guns. Where such is done, the glasses may be applied simultaneously so as to admix the frits while spraying. Likewise, the individual frits may be sprayed alternately to form thin layers. It is clear that other forms of physically combining in situ the low and high glass transition temperature glass may be employed.

Figure 3:
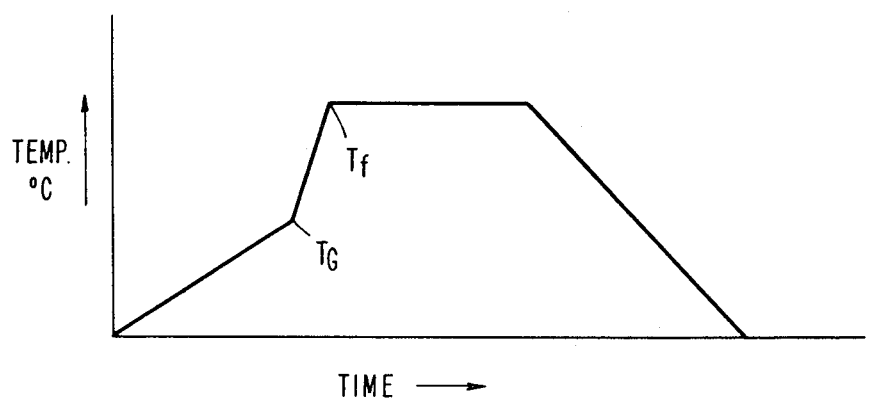
FIG. 3 shows a plot of the heating rate employed in carrying out the process, in accordance with the present invention.

For best results in flowing out the admixed frit of low and higher glass transition temperature glass, the thermal cycle applied to the frit may be according to the rates depicted in FIG. 3. By heating at rates analogous to that shown in FIG. 3, the glass layer formed thereby is relatively smooth and homogeneous. As can be seen in FIG. 3, the frit is gradually heated up to the glass transition temperature point, $T_G$, of the low glass transition temperature glass. During this interval of time, the substrate glass for the frit, as for example plate glass substrate 10 or 12, is heated up as rapidly as possible at a rate such that it does not crack. Likewise, during this interval of time, any organic binder used with the frit is burned up. Once the glass transition temperature of the low glass transition temperature glass has been reached, it is desirable to heat the frit at a rapid rate, again, however, constrained by possible cracking of the substrate plates. By rapid heating, the low glass transition temperature glass is caused to quickly flow out before significantly dissolving the higher glass transition temperature glass. Where heat is applied to the frit in the region beyond the glass transition temperature of the low glass transition temperature glass at a rate insufficient to cause this glass to quickly flow out, the viscosity thereof starts to increase before the glass is sufficiently liquid to flow smooth due to dissolution of the higher glass transition temperature glass into the low glass transition temperature glass. Since under this latter condition, the higher glass transition temperature glass becomes dissolved by the low transition temperature glass thereby increasing the viscosity of the latter glass before it has flowed smooth, the resultant glass formed thereby sets up rough, uneven and somewhat unhomogeneous.

For most glass compositions which might be employed as the admixed frit, in accordance with the principles of the present invention, the initially applied gradual heating up to the glass transition temperature of the low transition temperature glass thereof, may be at a heating rate of between 1° per minute to 5° per minute, as might be used, for example, with a 5 inches × 10.5 inches × ¼ inch sodalime plate substrate. After reaching the glass transition temperature of the low glass transition temperature glass, a rate of from 5° per minute and up, where practicable, may be applied. It is clear that in this latter instance, the higher the heating rate applied, the better the results. However, it is also clear that practical considerations will limit the heating rate that may be applied at this stage of the process, in accordance with FIG. 3. The rapid heating rate from the glass transition temperature $T_G$ of the low glass transition temperature glass is applied until the flow out temperature $T_f$ of same is reached. This flow out temperature, as indicated above, is that point where the glass is sufficiently liquid to readily flow smooth. As shown in FIG. 3, after having arrived at the flow out temperature, $T_f$, the temperature is maintained constant for a period of time sufficient to allow the higher glass transition temperature glass to adequately dissolve in the molten low glass transition temperature glass. Typically, this time is determined by the admixed frit composition selected, particle sizes, etc., and may run from a few minutes to several hours. Thereafter, as shown in FIG. 3, the glass is allowed to gradually cool.

Although it is clear that, in accordance with the principles of the present invention, any of a variety of relatively high glass transition temperature glass compositions may, in principle, be admixed with any compatible low glass transition temperature glass composition so as to form in situ a glass having an intermediate glass transition temperature, the following examples of low and higher glass transition temperature glass compositions have been found to be particularly suitable for gas panel display fabrication, as described above. These examples, designated Glass A and B, respectively, are given as follows:

GLASS A

|  | Percent by Weight |
|---|---|
| $SiO_2$ | 14.1 |
| PbO | 72.8 |
| $B_2O_3$ | 12.5 |
| $Al_2O_3$ | 0.2 |
| CaO | 0.1 |
| $Na_2O$ | 0.2 |
| MgO | 0.1 |

GLASS B

|  | Percent by Weight |
|---|---|
| $SiO_2$ | 71.11 |
| $Al_2O_3$ | 2.38 |
| CaO | 7.13 |
| $Na_2O$ | 14.45 |
| MgO | 3.76 |
| $K_2O$ | .30 |
| $B_2O_3$ | .13 |
| PbO | .74 |

The composition of Glass A is a low glass transition temperature lead-borosilicate based dielectric type glass, and the composition of Glass B is a sodalime-like glass. Although these glasses are given by way of example of preferred compositions, and have been indicated to be particularly suitable for fabrication of the above described gas panel display, it should be understood that these glasses may as readily be employed in the fabrication of any of a variety of electronic apparatus, and the like. Likewise, it should also be understood that other glass compositions which exhibit relatively diverse glass transition temperatures, and yet are compatible with one another, may as readily be employed in the in situ process of raising glass transition temperature, in accordance with the principles of the present invention.

Figure 4:
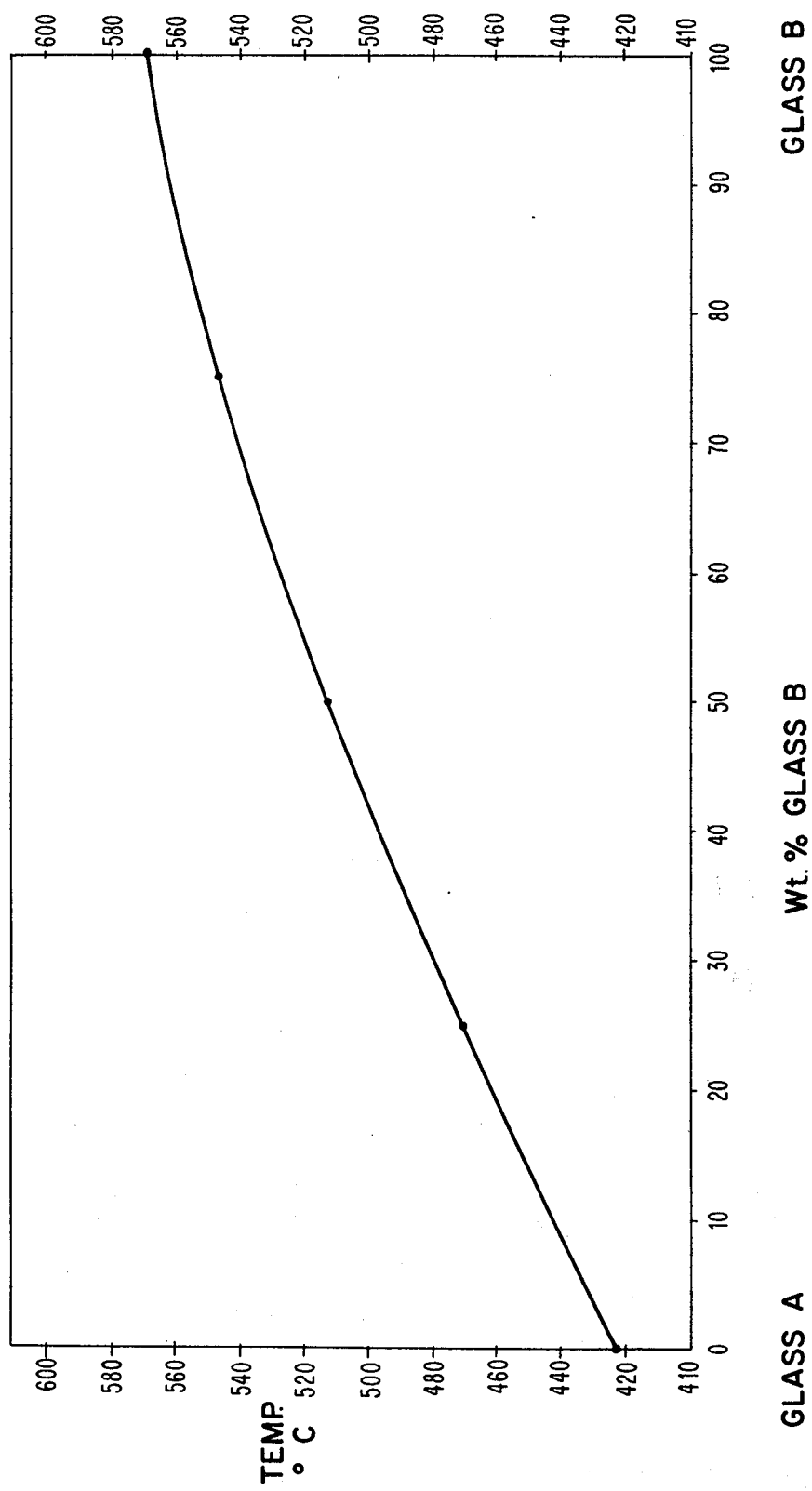
FIG. 4 shows a plot of glass transition temperature as it varies over the compositional range between exemplary first and second glass compositions, the second glass composition exhibiting, at its extreme, a significantly higher glass transition temperature than the first.

FIG. 4 shows the plot of glass transition temperature over the compositional range between Glass A and Glass B. It has been found that the members of the glass system, as taken over the entire compositional spectrum between Glass A and Glass B, exhibit a coefficient of thermal expansion which varies only slightly from one another. Likewise, it has been found that the primary effect of compositional variation is a gradual change in the glass transition temperature between the two end members, i.e., Glass A and Glass B. It should be noted that glass transition temperature may be experimentally detected on a viscosity or coefficient of thermal expansion versus temperature curve, by observation of the discontinuity in the gradual change of either of these properties. An alternative, preferred method of determining glass transition temperature is to employ differential thermal analysis (DTA) techniques, as described by Reisman et al. in the Journal Amer. Chem. Soc. 78,4514 (1956); ibid. 78,1536 (1956); ibid. 77,2115 (1955); ibid. 79,2039 (1957).

As can be seen from the plot shown in FIG. 4, the glass transition temperature of the respective glasses formed over the compositional range between Glass A and Glass B increases monotonically as a function of composition. Moreover, in addition to the relative constancy of the coefficient of thermal expansion, it has been found that there is negligible phase separation over the entire compositional range between Glass A and Glass B.

The glass system represented by FIG. 4 is particularly suitable where it is deposited upon substrates of conventional soft plate glasses, such as those glass plates commercially available from LOF or ASG. In addition, the glass system represented by FIG. 4 exhibits a high compatibility with conventional rolled plate glass and tin float plate glass, notwithstanding significant differences in the properties of these two types of plates. Whereas the variation of glass transition temperature is lens-shaped using Glasses A and B, other combinations have been found which show a linear variation with composition.

Thus, it is clear that because of the advantageous properties of a glass system formed from compatible end members, such as given in the example represented by FIG. 4, an infinite series of intermediate glasses may be synthesized in situ by choosing different proportions of the two end members such that the in situ formed glass part has the required flow out characteristics and resistance to reflow. In addition, it is clear that it is possible to begin with two intermediate compositions on the curve of FIG. 4 and arrive at a desired intermediate composition therefrom.

Thus, where it is desired to construct a glass system upon conventional plate glass, for example, the first layer, or the like, to be fabricated on the plate glass may be taken from the compositions given in FIG. 4. For example, the frit of an admixture of 25% by weight of Glass B and 75% by weight of Glass A may be sprayed upon the conventional plate glass. The temperature required to flow out the low glass transition temperature Glass A and dissolve therein the higher glass transition temperature Glass B is sufficiently low such as to avoid deformation of the underlying plate glass. On the other hand, the glass transition, and therefore reflow, temperature of the synthesized glass layer formed by this flow out process is sufficiently raised over that of the low glass transition temperature glass itself that subsequent elevated thermal cycling steps do not cause its reflow. Stated another way, the synthesized glass layer formed by the present process exhibits a sufficiently raised reflow temperature such that the next step in the process is not constrained to be performed below the original glass transition temperature of the low glass transition temperature glass per se, which otherwise would be the case were there no admixture comprising the higher glass transition temperature glass and subsequent in situ synthesis and flow out of the frit of this admixture. As hereinabove mentioned, this in situ flow out occurs at a temperature lower than that required where glass of an identical composition is first synthesized, and then the frit of the preequilibrated admixture thereof flowed out on plate glass. This next step might, for example, be some form of metallization fabrication, or the like, on the formed glass layer.

After the metallization step, or the like, a second glass layer may be formed, in situ, on the metallization or the like by again repeating the admixture and in situ flow out process steps employed in fabricating the first formed glass layer. Since, in this example of fabrication of a glass system, it might be desirable to synthesize the second glass layer such that it exhibits a lower glass transition and reflow temperature than the first formed glass layer, the next selected composition, for example, may comprise an admixture of 85% by weight of Glass A and 15% by weight of Glass B. The second glass layer would then be formed by flowing out in situ, a frit of this latter admixture on the first glass layer and overlying metallization, or the like. This flow out may be carried out at roughly the same temperature or less than that used to flow out the first glass layer, which is typically around 600°, or less. This flow out temperature is sufficiently low so as to avoid softening or reflow in both typical plate glass substrates that may be used and the first formed glass layer, the latter having a reflow point elevated by the presence of Glass B therein.

It should be realized that although the temperature hierarchy between typical plate glass substrates and Glass A is such that Glass A alone can be flowed out on the plate glass to form the first glass layer without deformation of the plate glass, that the first glass layer so formed thereby would have a sufficiently low glass transition and reflow temperature that a second glass layer including Glass A could not be flowed out thereon without reflow of the first layer.

By admixing higher glass transition temperature Glass B with low glass transition temperature Glass A and flowing out Glass A in situ on the plate glass substrate in a manner to dissolve Glass B therein so as to thereby form the first glass layer, the temperature cycle required for such flow out is such as to avoid deformation of the plate glass substrate, and yet the glass transition, and therefore reflow, temperature of the resultant first formed glass layer is sufficiently elevated because of the presence of Glass B that another layer comprising at least the same percentage by weight of Glass A may be fabricated thereon. It can be seen from FIG. 4 that, in the above example, the first formed glass layer was picked to have a glass transition temperature of around 470°C. The reflow temperature of this layer then, turns out to be around 620°C, which is sufficiently high so as to allow another layer of essentially Glass A to be flowed out thereon, in accordance with the process of the present invention.

As more specifically pertains to the gas panel application described in FIGS. 1 and 2, by admixing the frit of a selected percentage of higher glass transition temperature Glass B with low glass transition temperature Glass A, and thereafter flowing out in situ on plate glass substrates 10 and 12 the admixed frit so as to thereby dissolve Glass B in Glass A to form dielectric glass layers 28 and 32 according to time-temperature cycling akin to that shown in FIG. 3, deformation of the plate glass substrates is avoided. On the other hand, by this technique the glass transition temperature of the formed dielectric glass layers is sufficiently raised so that during the mentioned subsequent sealing process, reflow of the dielectric layers is thus avoided. By avoiding reflow of the formed dielectric glass layers, the crazing and the like of refractory layers 30 and 34 thereon, such as layers of MgO, is thereby avoided.

It is clear from the above example involving said first and second formed glass layers that a glassy system may be fabricated, in accordance with the broader aspects of the present invention, whereby the glass members of said system are formed by employing a plurality of successive in situ processing steps, in accordance with the in situ synthesis and flow out steps described herein. The glass composition of said successively formed members may be selected from the compositional range between two compatible glass compositions exhibiting different glass transition temperatures, such that the successively formed members exhibit successively lower glass transition temperatures. Alternatively, the process of the present invention may be employed in a single in situ operation where, for example, it may be desired to raise the glass transition temperature, and therefore softening or reflow point, of a glass part to be fabricated in a mold, or the like, using essentially a particular type glass. In the latter example, it may be necessary, after flowing out the glass frit in the mold, to employ an operation, such as a welding or sealing operation, at a temperature in excess of the reflow temperature of the molded part. In accordance with the present invention, by admixing to the frit a compatible glass composition having a higher glass transition temperature than the original frit and thereafter dissolving the higher glass transition temperature glass in the low glass transition temperature glass within the mold, the softening or reflow point of the part formed thereby may be raised sufficiently so as to avoid the softening or reflow caused by the ensuing welding or sealing operation.

It should again be noted that the practical flow out temperature of the in situ reacted admixture of the two glass frits, whether in a mold or on a substrate, is significantly less than would be required where the admixture is preequilibrated and then flowed out, although the resultant glass composition is the same in either instance. This arises because the flow out temperature is determined by the low glass transition temperature glass in the admixed frit rather than by the final composition of the in situ formed glass.

In a specific embodiment of the process of the present invention, glass compositions the same as, or substantially or essentially the same as, the above identified Glass A and Glass B compositions, or preequilibrated glass admixtures lying between these compositions, are employed in the fabrication of dielectric glass layers 28 and 32, in the gas panel arrangement of FIGS. 1 and 2. Conductors 14–18 and 22–26 may comprise lines of copper coated on each side with chromium. Layers 30 and 34 are comprised of MgO.

Commercially available ASG LUSTRON or LOF plate glass may be used for plates 10 and 12. Dielectric glass compatible with this type of plate glass, such as the dielectric glass given as Glass A, softens when available glass sealants, compatible with the plate glass, are employed to form welded bead 20.

The glass transition temperature of the dielectric glass of layers 28 and 32 to be formed using Glass A is predictably raised in situ by admixing therewith a selected proportion of Glass B. For example, 22.5% by weight of Glass B admixed with 77.5% by weight of Glass A will sufficiently raise the glass transition temperature of the glass of layers 28 and 32 so that subsequently employed thermal cycles for sealing and the like will not soften these layers thereby crazing, and the like, MgO layers 30 and 34. The frit of this 22.5%/77.5% by weight admixture is conveniently sprayed upon plates 10 and 12 and the conductors overlying these plates. The sprayed-on frit is then heated according to the heat rate cycle given in FIG. 3.

Heating rates for the 22.5%/77.5% by weight admixture of between 1°/min and 2°/min up to the glass transition temperature $T_G$ of the low glass transition temperature Glass A, as shown in FIG. 3, have been found satisfactory. $T_G$ for Glass A is approximately 425°C. From $T_G$ up to flow temperature $T_f$, heating rates of from 2°/min and up have likewise been found satisfactory. The flow temperature $T_f$, which equals approximately 600°C in this example, may then be maintained for approximately 2 to 6 hours. The structure is then cooled at approximately 2°/min.

In another example of a specific embodiment of the process of the present invention, rather than admix 22.5% by weight of Glass B with 77.5% by weight of Glass A, 50% by weight of Glass A in powdered form is admixed with 50% by weight of ground Glass B. This admixture is then preequilibrated by heating the admixture to approximately 1000°C for sufficient time to insure complete dissolution of the glasses in one another. The preequilibrated glass is then quenched in water and ground, and this ground glass is then admixed with ground Glass A in a proportion of, for example, 55% by weight of Glass A and 45% by weight of the preequilibrated ground glass. This admixture is thereafter sprayed upon substrates 10 and 12 and heated to flow out, in the same manner as previously described with regard to FIG. 3. It can be seen that the steps of this embodiment result in dielectric glass layers of the same composition as given above using a single admixing step, i.e. 22.5% by weight of Glass B/77.5% by weight of Glass A.

It should be noted that where difficulty is encountered in spraying the frit of a particular admixed glass composition onto substrates 10 and 12 because of gelling of the slurry this gelling may be prevented by adding a small trace of acid to the admixture. Thus, by uniformly mixing approximately 1 part in 10,000 of acid to the admixed frit, gelling is readily avoided. It should be noted, however, that the amount of acid added is not critical, so long as a minimal amount of approximately 1 part in 10,000 is used. In the particular glass compositions described above, adding 1 part in 10,000 of nitric or acetic acid, for example, to the frit would be sufficient to avoid any possible gelling.

It is clear that any of a variety of compositions made from different proportions of Glass A and Glass B may readily be employed to fabricate, in situ, dielectric layers 28 and 32, in accordance with the principle of the present invention. Likewise, it is clear that any number of preequilibration steps to form intermediate glasses in any compositional proportion, to be admixed with any of Glass A, Glass B, or other intermediate glasses, may as readily be employed. In this regard, although mixtures of Glasses A and B may readily be employed to form intermediate glass compositions, a preferred method of forming these intermediate compositions is to use glass forming oxide and carbonate constituents.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a structure comprising a plurality of conductive lines supported on a dielectric glass substrate, a layer of admixed glass covering said conductive lines and supported by said substrate wherein said admixed glass is a composition G consisting of a first composition A composed of 14.1%, SiO$_2$, 72.8% PbO, 12.5% B$_2$O$_3$, 0.2% Al$_2$O$_3$, 0.1% CaO, 0.2% Na$_2$O, and 0.1% MgO and a second composition B composed of 71.11% SiO$_2$, 2.38% Al$_2$O$_3$, 7.13% CaO, 14.45% Na$_2$O, 3.76% MgO, 0.30% of K$_2$O, 0.13% B$_2$O$_3$, and 0.74% Pbo with said percentages being approximate percentages by weight and with the composition G being determined according to the relationship $G = F(A) + (1-F)B$, where $G$ is the whole composition and $F$ is the fractional part less than one by weight that Glass $A$ is of $G$ and $A$ and $B$ are said first and second compositions.

* * * * *